(12) United States Patent
Kaptur (10) Patent No.: US 6,554,355 B2
(45) Date of Patent: Apr. 29, 2003

(54) ANATOMICAL BICYCLE SEAT

(76) Inventor: Robert Kaptur, 516 Kennesaw, Birmingham, MI (US) 48009

( * ) Notice: Subject to any disclaimer, the term of this patent is extended or adjusted under 35 U.S.C. 154(b) by 0 days.

(21) Appl. No.: 09/730,957

(22) Filed: Dec. 5, 2000

(65) Prior Publication Data

US 2002/0067059 A1 Jun. 6, 2002

(51) Int. Cl.⁷ ................. B62J 1/00; B62J 1/18
(52) U.S. Cl. ............ 297/195.1; 297/201; 297/214; 297/215.1
(58) Field of Search ................. 297/195.1, 201, 297/214, 215.1

(56) References Cited

U.S. PATENT DOCUMENTS

| | | |
|---|---|---|
| 564,588 A | 7/1896 | Burgess |
| D25,877 S | 8/1896 | Carre |
| D25,951 S | 8/1896 | Wilkinson et al |
| 575,509 A | 1/1897 | Newell |
| 576,192 A | 2/1897 | Hoyt |
| D26,893 S | 4/1897 | Craig |
| 586,997 A | 7/1897 | Grout |
| 591,330 A | 10/1897 | Downes |
| D28,822 S | 6/1898 | Hunt |
| D28,874 S | 6/1898 | Hildreth |
| 606,818 A | 7/1898 | Best |
| 608,089 A | 7/1898 | Wellmann |
| 619,179 A | 2/1899 | Hunt |
| 694,875 A * | 3/1902 | Meighan ............... 297/201 |
| 3,844,610 A * | 10/1974 | Adams ............... 297/214 X |
| 4,063,775 A * | 12/1977 | Mesinger ............... 297/201 |
| 4,369,998 A * | 1/1983 | Blase ............... 297/201 X |
| 4,387,925 A | 6/1983 | Barker et al. ............... 297/201 |
| 4,512,608 A * | 4/1985 | Erani ............... 297/201 |
| 4,773,705 A | 9/1988 | Terranova |
| 4,877,286 A * | 10/1989 | Hobson et al. ......... 297/201 X |
| 4,909,522 A * | 3/1990 | Flanigan ............... 297/214 X |
| 5,203,607 A * | 4/1993 | Landi ............... 297/214 |
| 6,068,333 A | 5/2000 | Dixon ............... 297/201 |
| 6,095,600 A | 8/2000 | Mattingly ............... 297/201 |

FOREIGN PATENT DOCUMENTS

EP  0 816 214 A2  1/1998

OTHER PUBLICATIONS

Website, *http://www.spongywonder.com*, "Good Health and Great Performance with . . . The Spongy Wonder Bicycle Seat Solution!", Bicycle Seats and a Solution to They Nasty Things They Do, Copyright 1999 Spongy Wonder Inc., 14 pp.

* cited by examiner

Primary Examiner—Rodney B. White
(74) Attorney, Agent, or Firm—Brooks & Kushman P.C.

(57) ABSTRACT

A bicycle seat for a bicycle having a frame with a seat post. A seat base plate is mounted at the upper end of the seat post. Passenger supporting extensions are mounted pivotally on the base plate for limited angular displacement relative to a fore-and-aft centerline of the seat. A cushion member is supported on the base plate, a cushion with a rounded peripheral surface is secured to each extension, the cushion for the base plate having a rounded periphery that registers with the rounded surface of each cushion on the extensions. The cushion for the base plate has a rearward margin defining a shoulder providing a reaction location that accommodates rearward force reaction to forces applied by the right ilium and the left ilium of the pelvis of a bicycle rider. Each cushion for the extensions cooperates with the rounded periphery of the base plate cushion to form a crease that is positioned to receive an ischium extremity of the pelvis of a bicycle rider. The forces distributed to each ischium of the pelvis of a bicycle rider having a fore-and-aft component and a lateral component, thereby providing fore-and-aft stability and lateral stability for the bicycle rider.

8 Claims, 5 Drawing Sheets

_Fig. 5_

_Fig. 6_

_Fig. 7_

Fig. 8

ANATOMICAL BICYCLE SEAT

TECHNICAL FIELD

The invention relates to a bicycle seat wherein the characteristics of the seat are compatible with the anatomical characteristics of a pelvis of a bicycle rider.

BACKGROUND OF THE INVENTION

A conventional bicycle seat usually comprises a broad saddle portion at a rearward region and a horn extending forward, which provides lateral support for the rider. The horn creates a pressure point at the crotch of the rider, which may adversely affect blood vessels and nerves and cause distress or injury to surrounding anatomical organs and tissues. For example, in the case of male bicycle riders, injury to the prostrate or surrounding nerves and blood vessels may occur after repeated use of the bicycle seat. Lateral support provided by such conventional bicycle seats also presents a concern for a rider because of the possibility of abrasion of soft tissue due to contact between the seat horn and the inside of the thigh.

A conventional bicycle seat is designed to provide a three-point contact for supporting the bicycle rider. The first support point is the horn itself, as mentioned above. The right ischium and the left ischium of the pelvis of the rider, which are supported on the broad saddle portion of the seat, provide two additional support points. The forces transmitted to the pelvis by the bike seat through each ischium is a source of discomfort. Further, because the upper body center-of-gravity is not necessarily centered between the ischia and the crotch contact with the horn, a force couple is created, which can cause tipping of the pelvis structure of the rider. The force couple is transferred to the sacrum, a group of fused vertebrae. A group of sacroiliac muscles join the spinal column, including the sacrum, to the pelvis. The force couple created by the bicycle seat thus has a potential for causing back pain after continued use of the bicycle seat.

Earlier prior art designs have attempted to match the design of the bicycle seat to the anatomy of a human pelvis. An example of such a design is shown in U.S. Pat. No. 591,330. That design does not provide, however, stabilizing force reactions necessary for stability of the rider. Neither does it take into account variations in the dimensions of the pelvis for different bicycle riders. Nor does it eliminate the pressure point in the region of the gluteus maximus at the end of each ischium.

U.S. Pat. No. 608,089, which is another example of prior art designs that take into account the anatomy of the bicycle rider, discloses a pair of independent saddles that are shaped to conform to the rider's body. There is no discussion in the '089 patent, however, of the need to eliminate pressure points. Further, the individual spring supports for the two sides of the bicycle saddle of the '089 patent may produce a destabilizing effect on the rider.

U.S. Pat. No. 4,387,925 discloses another design that takes into account the anatomy of the bicycle rider. The weight of the rider, however, would be uniformly distributed over the entire surface of a seat of that design. This would create, as mentioned previously, pressure points as forces are transmitted to the end of each ischium.

Aside from the foregoing characteristics of prior art designs, none of those designs provides a solution to the problem of irritation of hemorrhoid tissues.

DISCLOSURE OF INVENTION

It is an objective of the invention to provide a bicycle seat that is compatible with the anatomy of a bicycle rider, whereby forces at pressure points on the pelvis structure of the rider are substantially reduced, and wherein gravity and inertia forces transmitted through the pelvis to the vehicle seat are accommodated without creating unbalanced force couples that would produce undesirable stress on the anatomy of the rider.

Accordingly, it is a further objective to provide a bicycle seat for accommodating inertia forces and gravity forces transmitted between the pelvis of the rider and the bicycle seat so that lateral stability in each lateral direction, as well as fore-and-aft stability of the rider, is accomplished.

It is an objective also to provide a bicycle seat wherein the forces transmitted between the pelvis of the rider and the seat are balanced, thereby relieving stress on the sacrum portion of the spine of the rider.

In carrying out the foregoing objectives, the invention comprises a rigid base plate on which a rider supporting cushion is affixed, the cushion having a rounded periphery. A rearward shoulder is formed on the cushion periphery to provide fore-and-aft stability.

A pair of extension plates is connected pivotally to the base plate at laterally spaced locations on opposite sides of the base plate geometric center plane. A rounded cushion is attached to each extension plate. Each extension plate is adjustable as shown by the arcuate arrows 36' and 38' in FIG. 3. Each rounded cushion on the extension plates registers with the rounded periphery of the base plate cushion to define a crease in a plane obliquely situated relative to the center plane of the base plate. The right ischium and the left ischium of a rider, during use of the seat by a rider, are disposed within the creases whereby gravity and inertia force components are transmitted to the rider's pelvis in both a fore-and-aft direction and in each lateral direction. This provides transverse and fore-and-aft stability. The fore-and-aft stability provided by the rearward shoulder on the base plate cushion complements the stability provided by the extension plate cushions.

The ischium is the lowest and the strongest portion of the pelvis bone. It extends downward to form a large tuberosity. It then curves forward to form the pubis. The ischium also forms the lower and back part of the hip bone.

A female pelvis is less massive than a male pelvis, and the ilia of a female pelvis are less curved so that the iliac spines of the lower portion of the ischia are more widely separated. These differences between the male pelvis and the female pelvis make it necessary to adjust the lateral distance between the extension plates so that the seat assembly can accommodate both female and male riders with maximum stability and comfort. The adjustment of the extension plates relative to the base plate is accommodated in the design of the invention by a pivotal connection between the two extension plates and the base plate.

The base plate is supported by a rail holder support at the underside of the base plate. A pair of fore-and-aft adjustment support rails is secured to the rail holder, which in turn is secured to the underside of the base plate. An adjustable lock mechanism permits the seat assembly to be adjusted in a fore-and-aft direction along the support rails so that the position of the seat can be adjusted to suit the preference of the rider.

PARTICULAR DESCRIPTION OF THE INVENTION

Figure 1:
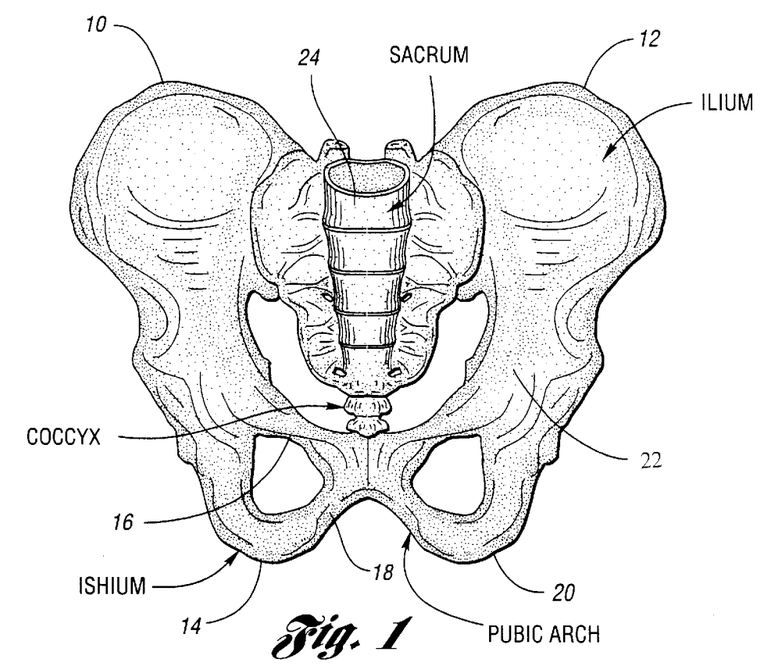
FIG. 1 is a schematic illustration of a male pelvis bone and sacrum.
Figure 2:
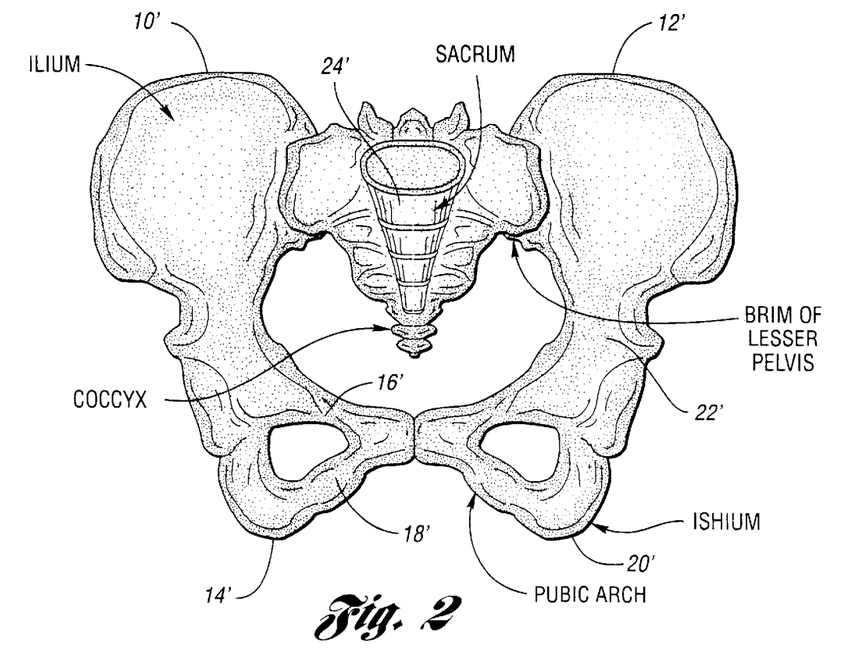
FIG. 2 is an illustration of the pelvis bone and sacrum of a female.

For the purpose of describing the orthopedic features of a human hip, reference will be made to the diagrammatic sketches of a human pelvis, as seen in FIGS. 1 and 2. FIG. 1 is a sketch of the upper plane of a male pelvis. FIG. 2 is a corresponding sketch of a female pelvis.

The upper rear portion of the pelvis of FIG. 1 includes a right ilium 10 and a left ilium 12. Femur bones of the right leg and the left leg of a male rider would be joined by a ball-and-socket type connection to the pelvis. Each femur bone would have a ball that would fit in a socket of each ilium 10 and 12. The lower portion of the pelvis of FIG. 1 defines an ischium 14 with spines 16 and 18. The left side of the pelvis, which is the right side of the view as seen in FIG. 1, has an ischium 20 joined to the ilium 12 by a so-called lesser pelvic bone 22. A corresponding pelvic bone is seen at the opposite side of the pelvis of FIG. 1.

The corresponding elements of the pelvis of a female are shown in FIG. 2. Similar reference notations are used for corresponding parts of the pelvis of FIGS. 1 and 2, although prime notations are added to the numerals in FIG. 2.

In comparing the pelvis of FIG. 1 with the pelvis of FIG. 2, it is apparent that the lateral spread between the ilia on each lateral side of the pelvis is greater in the case of the female pelvis of FIG. 2 than in the case of the male pelvis of FIG. 1. The same is true of the location of the lowest point of the ischium 14 relative to the lowest point of the ischium 20 in the case of FIG. 1 compared to the corresponding characteristics of the ischium 14' and the ischium 20' in FIG. 2.

In each of the pelvis structures of FIGS. 1 and 2, a sacrum, which forms a part of the spine, is secured in a fixed fashion by cartilage to the adjacent ilium 12 and the adjacent ilium 10 in the case of FIG. 1, and to the ilium 12' and the ilium 10' in the case of FIG. 2. The sacrum of FIG. 1 is shown at 24 and the corresponding sacrum in FIG. 2 is shown at 24'. Any unbalanced forces transmitted to the sacrum from the right or left ilium have an effect on nerve tissues located within the spine and extending through the sacrum.

Figure 3:
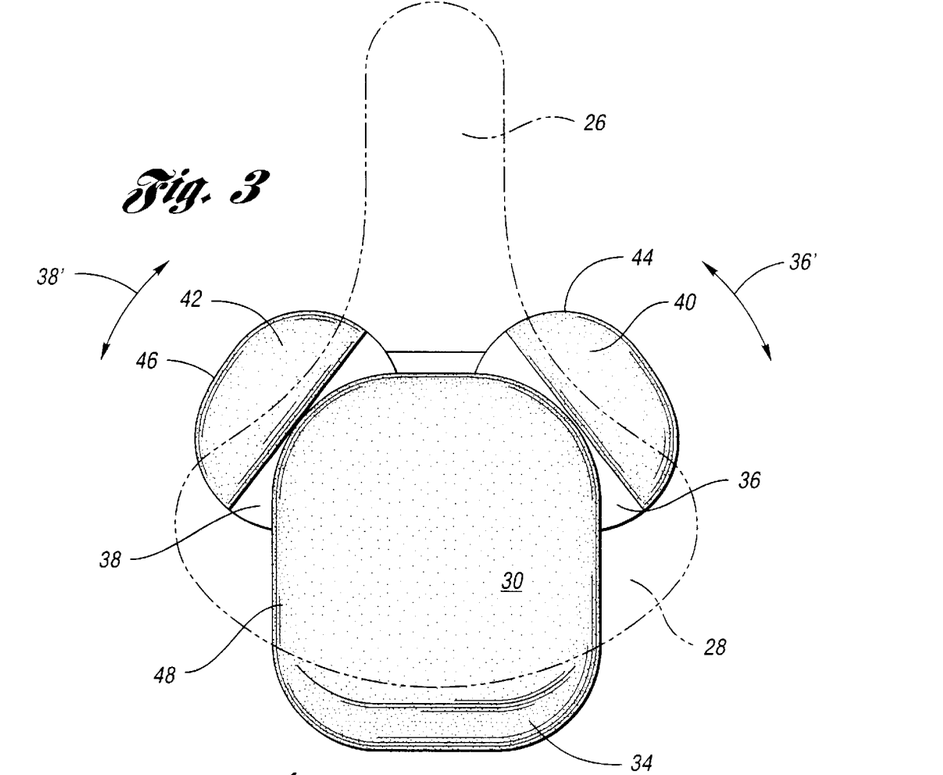
FIG. 3 is a plan view of the seat assembly of the invention.
Figure 4:
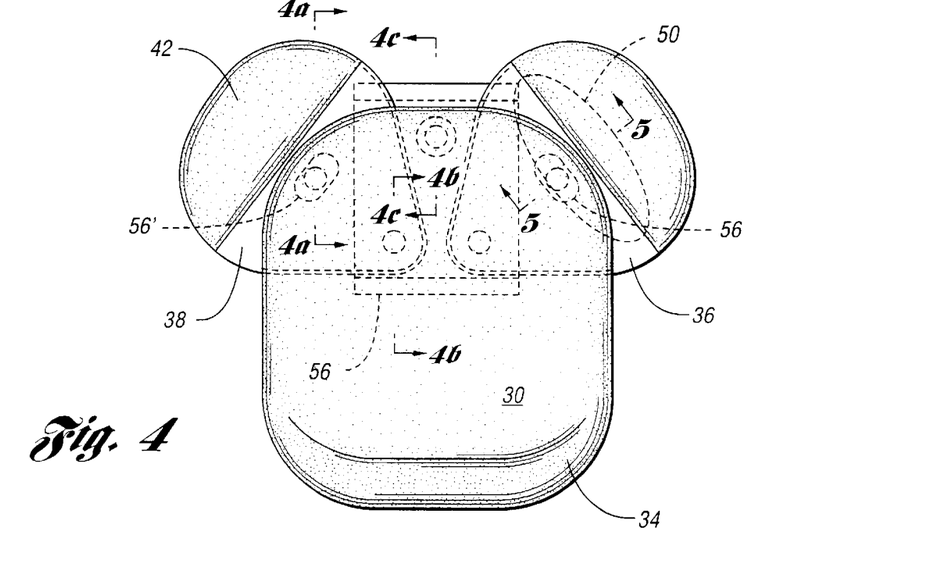
FIG. 4 is a plan view similar to the plan view of FIG. 3 showing the details of the extension plate.

The bike seat assembly of FIGS. 3 and 4 provides a three-point contact between the hip bones of the rider and the upper surface of the seat assembly. FIG. 3 shows, superimposed on the seat assembly of the invention, a conventional seat with a horn 26 that extends forward from the body of the seat, as seen at 28. In the case of a conventional seat assembly, which is outlined in FIG. 3 at 26 and 28, each ischium makes contact at the enlarged portion of the seat assembly. This creates discomfort after extended use. The point contact of the ischium with the conventional seat further creates a force couple because the upper body center-of-gravity is not necessarily centered between the ischia and the other points of contact between the pelvis and the seat. Thus, a force couple is created, which can cause a tipping of the pelvis structure. The force couple can be transferred to the sacrum, which is a group of fused vertebrae in the spinal column. The vertebrae are joined by means of sacroiliac muscle to the spinal column, creating a force distribution path from the spinal column to the pelvis. This can create back problems for the bicycle rider.

The bicycle seat of the invention relies solely on the right and left ischium for both lateral and vertical support. The removal of pressure points from the perineal or crotch area of the rider reduces rider discomfort while providing lateral and fore-and-aft stability. Further, transverse and lateral stresses on the soft tissue in the anal region eliminates a tendency for the rider to develop hemorrhoids.

Minimal loading on the femur region of the hip bone focuses gravity support as completely as possible at the ischia. This reduction in the loading on the femur region will reduce the possibility of chafing.

The elimination of the horn of conventional designs makes it possible for the rider to induce a slight lateral rocking motion during operation of the bicycle, which momentarily reduces loading on each ischium alternately without causing chafing. The legs of the rider may move without being restrained by a conventional horn.

Figure 7:
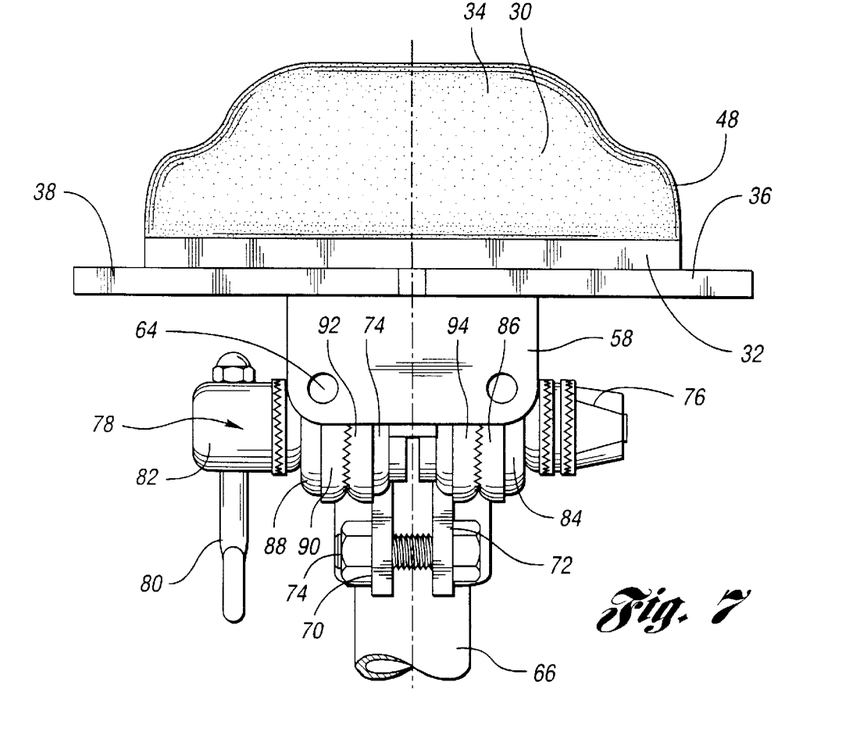
FIG. 7 is a rear elevation view of the seat assembly of FIGS. 3 and 4.
Figure 8:
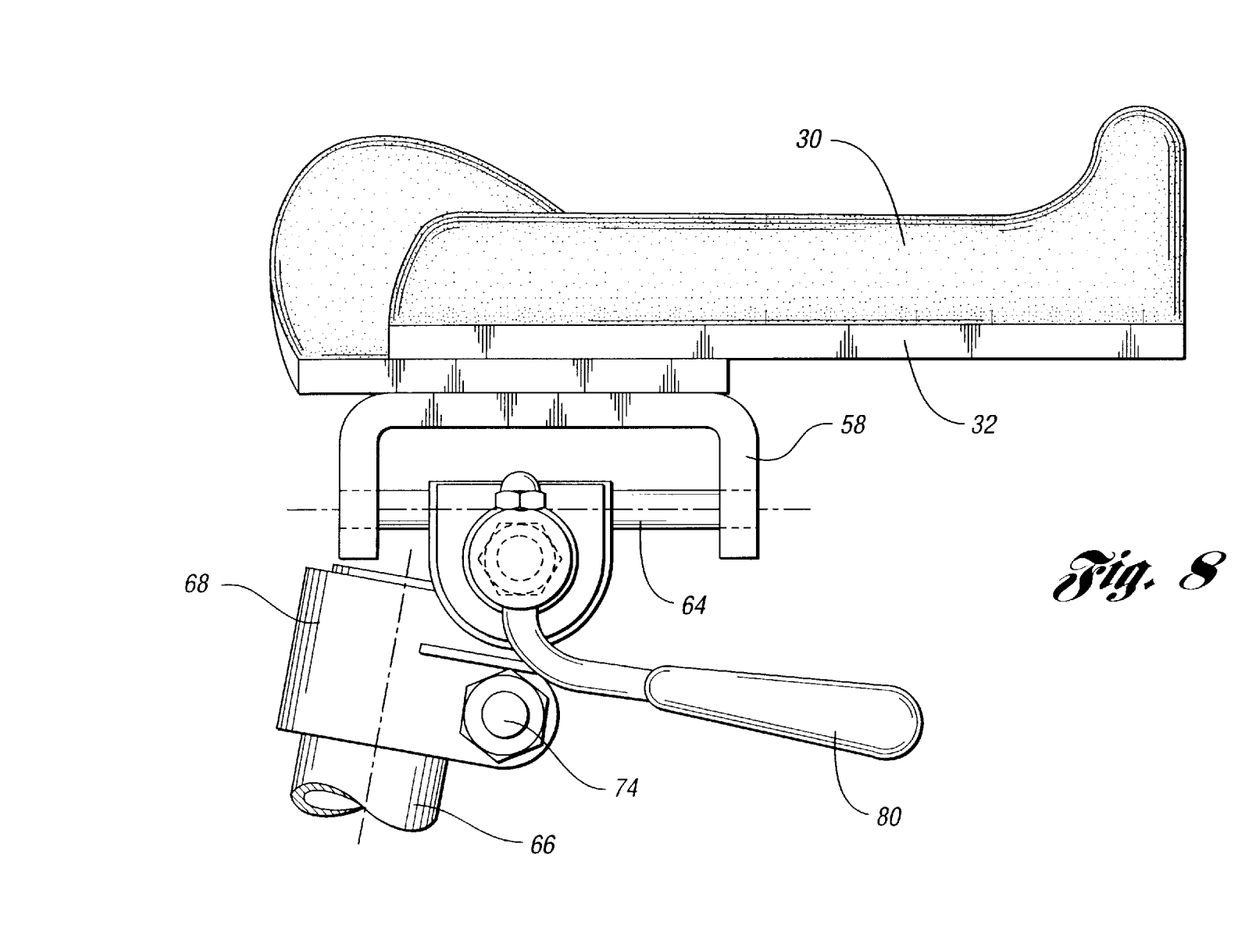
FIG. 8 is a side view of the seat assembly of FIGS. 3, 4 and 7.

FIGS. 3 and 4 show a cushion 30 mounted on a base plate, seen in FIGS. 7 and 8 at 32. The base plate 32 is entirely covered by the cushion 30. A shoulder 34, which forms a part of the cushion 30, is located at the rear margin of the base plate 32. The cushion 30 defines right and left rearward support locations for a rider.

A pair of extension plates 36 and 38 is shown in FIGS. 3 and 4. Each plate 36 and 38 has secured thereon a rounded cushion, as shown at 40 and 42, respectively. The margin of each cushion 40 and 42 is rounded, as shown at 44 and 46, respectively. The oblique surfaces on the cushions 40 and 42 register with a rounded periphery 48 on the cushion 30. This rounded periphery is best seen in FIGS. 5 and 7.

Figures 5, 6:
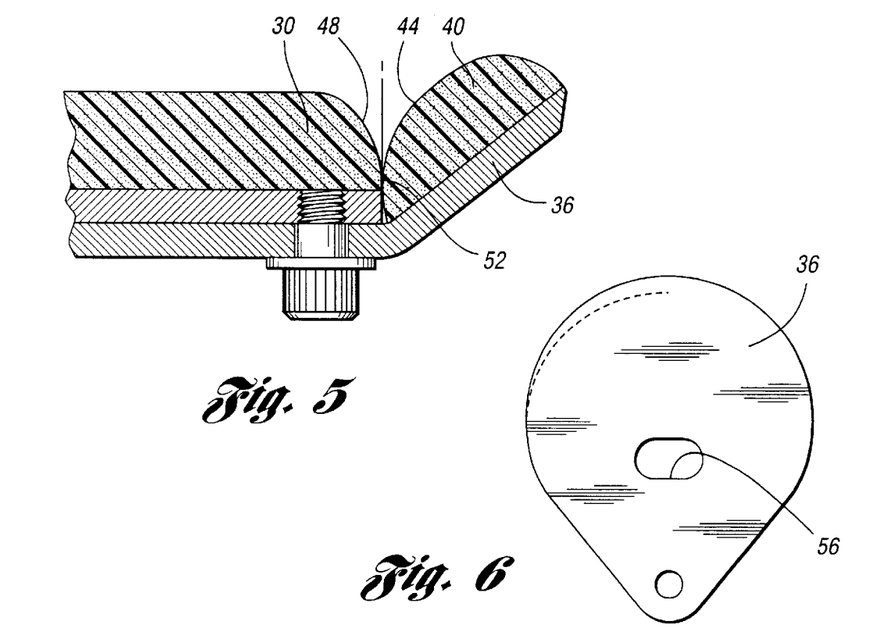
FIG. 5 is a partial cross-sectional view of a portion of the seat assembly as seen from the plane of section line 5—5 of FIG. 4.
FIG. 6 is a plan view of one of the pair of extension plates seen in the assembly views of FIGS. 3 and 4.

FIG. 5 is a detailed view that shows a crease created at the juncture of the rounded periphery of the portion of the cushion 30 with a rounded surface 44 of the cushion 40. A corresponding crease is formed between the curved surface 46 of extension 38 with rounded periphery 48. The creases define right and left forward support locations for a rider.

In FIG. 4, the dotted line ellipse 50 indicates the region of contact between the right ischium of the rider and the cushions 40 and 30 of the seat assembly. This feature is typical also of the left ischium. The lower extremity of the right ischium 14 or 14' would be located at the crease between the cushion 40 and the cushion 30. This crease is indicated in the cross-sectional view of FIG. 5 at 52. A corresponding crease is created for the left ischium.

Figure 4A:
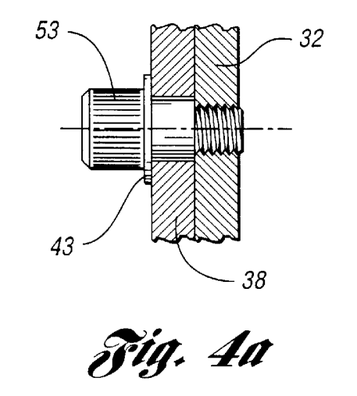
FIG. 4a is a cross-sectional view taken along the plane of section line 4a—4a of FIG. 4.

The attachment of the extension plates to the base plate may be seen by referring to FIG. 4a. The base plate 32 threadably receives a shoulder bolt 53, which clamps the extension plate 38 to the base plate 32. A steel washer 43 may be used if desired to assist in creating a clamping force.

Figure 4B:
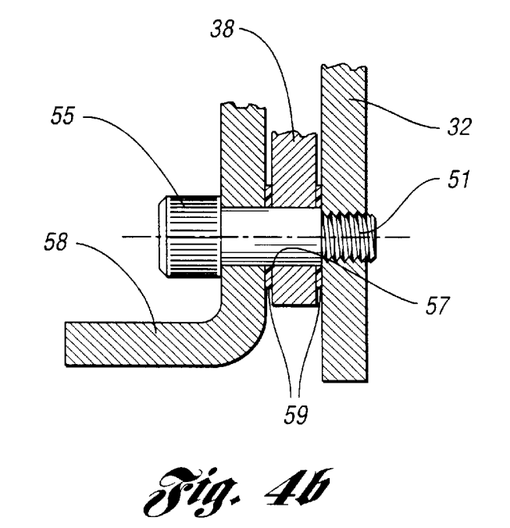
FIG. 4b is a cross-sectional view taken along the plane of section line 4b—4b of FIG. 4.

Plate 38 is connected also to base plate 32 by a shoulder bolt 55, which is threadably received in a threaded opening in base plate 32, as shown at 51. A shank of the bolt 55 extends through opening 57 in the extension plate 38. Teflon washers 59 are located between the extension plate 38 and the adjacent plates 32 and 58, the latter being a rail holder bracket, which will be described with reference to FIGS. 7 and 8.

The extension plate 38 can be pivoted about the axis of bolt 55 to vary the angularity of the cushion 42 relative to the cushion 30. A corresponding connection between the extension plate 36 and the base plate 32 is seen in FIG. 5. The cushion 40 can be adjusted angularly relative to the base plate. That adjustment can be made independently of the adjustment of cushion 42, depending upon the spread between the ischia of the rider.

Figure 4C:
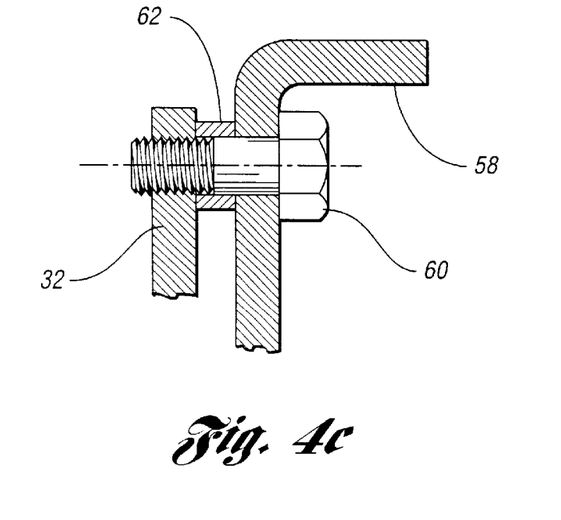
FIG. 4c is a cross-sectional view taken along the plane of section line 4c—4c of FIG. 4.

FIG. 4c shows a bolt connected at the center plane of the seat assembly between the base plate 32 and the rail holder bracket 58. It comprises a clamping bolt 60, which is threadably connected to the base plate 32. A spacer 62 is located between the base plate 32 and the rail holder 58 to maintain the base plate in parallel disposition with respect to the rail holder. The extension plate 38, as seen in FIG. 6, has a slotted opening 56 corresponding to slotted opening 56' of the extension plate 38.

The rail holder 58 defines a generally U-shaped bracket shown in FIGS. 4c and 8. The extension plates 36 and 38 are situated between the lower surface of the base plate 32 and the upper surface of the rail holder 58. A pair of adjustment rails 64 extend between the legs of the U-shaped bracket 58, as seen in FIGS. 7 and 8. A bicycle post, which forms a part of the bicycle frame, is shown in FIGS. 7 and 8 at 66. A collar 68 surrounds the upper end of the post 66. The ends of the collar, shown at 70 and 72 in FIG. 7, are clamped together by clamping bolt 74.

A cam lock nut 76, seen in FIG. 7, is threaded on one end of a cam lock assembly 78, which may be of conventional design. Cam lock assembly 70 has a manually adjustable lever 80 extending through a cam lock housing 82. A cam connection between the lever 80 and a through-bolt, not seen in FIG. 7, permits the cam lock to apply a clamping force to clamping elements 84 and 86 situated on opposed sides of one of the adjustment rails 64. A corresponding pair of clamping elements 88 and 90 establishes a clamping force on the opposite clamping rail 64. If the through-bolt and the adjusting cam lock nut 76 are released, the clamping force of the elements 88 and 90 and the elements 84 and 86 is relaxed, thereby permitting the rider to adjust the seat assembly fore-and-aft on the adjustment rails 64. Vertical tilting motion of the seat assembly can be accomplished when the through-bolt is released by the cam lever 80 to permit adjustment of serrated element 92 relative to the clamping element 90 and adjustment of serrated element 94 relative to the clamping element 86. The serrated elements 92 and 94 are connected to the base plate 32.

The cushion 30 on the base plate and the cushions 40 and 42 may be formed of an elastomer foam, such as polyethylene. This material can be molded to form the rounded shape seen in FIGS. 3, 4, 7 and 8. The plates may be formed of structural aluminum alloy.

As previously indicated, the adjustment of the extension plates can be made to accommodate a biker's pelvic structure. This adjustment can be limited, for example, to plus or minus 10 degrees from a center position.

The margin of the adjustment plates can be provided with sheared corners, as indicated in FIG. 5, to limit the total width of the seat assembly. The polyethylene cushions may have a vinyl or leather cover on the rounded surfaces.

Although one embodiment of the invention has been disclosed, it will be apparent to persons skilled in the art that modifications may be made without departing from the scope of the invention. All such modifications and their equivalents are intended to be covered by the following claims.

What is claimed is:

1. A bicycle seat assembly for a bicycle frame to support a rider, the seat assembly being adapted for adjustable compatibility with anatomical characteristics of most riders whereby a rider is supported at left and right rearward support locations and left and right forward support locations;

the seat assembly comprising:
 a mounting post;
 a base plate secured to the top of the mounting post;
 a first cushion attached to an upper surface of the base plate, the periphery of the first cushion being rounded;
 a pair of extension plates mounted for pivotal adjustment movement about adjustment axes of on the base plate; and
 a pair of second cushions attached to upper surfaces of the extension plates;
 each of the pair of second cushions being rounded;
 each of the second cushions and the first cushion having a contoured surface whereby a crease between adjacent contoured surfaces is defined on each lateral side of the base plate;
 the spacing of the creases being variable upon pivotal adjustment of the extension plates;
 the creases thereby being generally vertically aligned with the left and right forward support locations and the first cushion being generally in alignment with the left and right rearward support locations whereby the rider has support with both lateral stability and fore-and-aft stability.

2. The bicycle seat assembly set forth in claim 1 wherein the first cushion comprises a cushion shoulder at the rearward margin of the periphery of the first cushion thereby providing fore-and-aft stability as the right and left rearward support locations engage the cushion shoulder.

3. The bicycle seat assembly set forth in claim 2 wherein each crease between the contoured surfaces of the first cushion and the second cushion is disposed at an acute angle relative to a fore-and-aft axis of the base plate whereby both longitudinal and transverse force components acting on the cushions provide stability for a rider.

4. The bicycle seat assembly set forth in claim 1 wherein the extension plates are movable about the adjustment axes thereby varying the transverse distance between the second cushions to accommodate variable distances between the right and left forward support locations.

5. The bicycle seat assembly set forth in claim 4 wherein the adjustment axes are located rearward of the location of the crease on the opposite lateral sides of the base plate whereby the right and left forward support locations are forward of the adjustment axes.

6. The bicycle seat assembly set forth in claim 4 wherein the extension plates and the base plate include relative angular adjustment limiting members that are engageable to define a predetermined degree of adjustment of the second cushions.

7. The bicycle seat assembly set forth in claim 1 wherein the base plate is secured to the top of the mounting post by an attachment comprising a mounting rail bracket secured to the underside of the base plate;

at least one mounting rail supported on the mounting rail bracket; and a releasable clamp connected to the mounting post for securing the mounting rail to the mounting post;

the clamp, when released, accommodating fore-and-aft adjustment of the seat assembly relative to the bicycle frame.

8. The bicycle seat assembly set forth in claim 1 wherein the adjustment axes are located rearward of the location of the crease on the opposite lateral sides of the base plate whereby the right and left forward support locations are forward of the adjustment axes.

* * * * *

UNITED STATES PATENT AND TRADEMARK OFFICE
CERTIFICATE OF CORRECTION

PATENT NO.    : 6,554,355 B2
DATED         : April 29, 2003
INVENTOR(S)   : Robert Kaptur It is certified that error appears in the above-identified patent and that said Letters Patent is hereby corrected as shown below:

<u>Column 6,</u>
Line 8, after "frame" insert -- having a forward end and a rearward end --.
Line 16, after "post" and before the semi-colon, insert -- , the base plate having a forward portion and a rearward portion that correspond to the forward and rearward ends of the bicycle frame --.
Line 21, after "axes" insert -- adjacent the forward portion --.
Line 21, after "of" delete "on".
Lines 25 and 26, delete "being rounded, each of the second cushions".
Line 29, delete "each" and substitute -- opposite --.
Line 29, delete "side" and substitute -- sides --.

Signed and Sealed this

Twenty-third Day of September, 2003

JAMES E. ROGAN
*Director of the United States Patent and Trademark Office*